(12) United States Patent
Kobayashi

(10) Patent No.: US 9,481,355 B2
(45) Date of Patent: Nov. 1, 2016

(54) DRIVING DEVICE FOR HYBRID VEHICLE

(75) Inventor: Atsushi Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 13/979,547

(22) PCT Filed: Feb. 3, 2012

(86) PCT No.: PCT/JP2012/052523
§ 371 (c)(1),
(2), (4) Date: Jul. 12, 2013

(87) PCT Pub. No.: WO2012/108357
PCT Pub. Date: Aug. 16, 2012

(65) Prior Publication Data
US 2013/0288854 A1    Oct. 31, 2013

(30) Foreign Application Priority Data
Feb. 8, 2011    (JP) .................................. 2011-025503

(51) Int. Cl.
*F16H 37/06* (2006.01)
*B60W 20/00* (2016.01)
(Continued)

(52) U.S. Cl.
CPC ............... *B60W 20/00* (2013.01); *B60K 6/36* (2013.01); *B60K 6/442* (2013.01); *B60K 6/547* (2013.01);
(Continued)

(58) Field of Classification Search
USPC .................... 74/661, 664, 665 GA, 665 T
See application file for complete search history.

(56) References Cited

U.S. PATENT DOCUMENTS 5,839,533 A * 11/1998 Mikami ................ B60K 6/365
180/165
6,176,808 B1 * 1/2001 Brown .................... B60K 6/365
180/65.25
(Continued)

FOREIGN PATENT DOCUMENTS

JP    2002-526326 A    8/2002
JP    2003-314614 A    11/2003
(Continued)

OTHER PUBLICATIONS

Japanese Office Action dated Nov. 12, 2013 in corresponding Japanese Application No. 2012-556860, with English Translation. (4 pages).
(Continued)

*Primary Examiner* — Ha D Ho
(74) *Attorney, Agent, or Firm* — Westman, Hattori, Daniels & Adrian, LLP

(57) ABSTRACT

A driving device for hybrid vehicle, having an engine, a first motor capable of generating electric power by driving force of the engine, a second motor capable of supplying driving force to drive wheels, a first driving force transmission path for transmitting driving force of the engine to the drive wheels, a second driving force transmission path for transmitting driving force between the first motor and the engine, and a third driving force transmission path for transmitting driving force of the second motor to the drive wheels, includes a second damper capable of absorbing torque fluctuations in the second driving force transmission path and a third damper capable of absorbing torque fluctuations in the third driving force transmission path, in addition to a first damper capable of absorbing torque fluctuations in the first driving force transmission path.

9 Claims, 11 Drawing Sheets

(51) Int. Cl.
  *B60K 6/36* (2007.10)
  *B60K 6/442* (2007.10)
  *B60K 6/547* (2007.10)
  *B60L 11/14* (2006.01)
  *B60L 15/20* (2006.01)
  *B60W 30/20* (2006.01)
  *B60L 11/12* (2006.01)

(52) U.S. Cl.
  CPC ............. *B60L 11/123* (2013.01); *B60L 11/14* (2013.01); *B60L 15/20* (2013.01); *B60W 30/20* (2013.01); *B60L 2240/421* (2013.01); *B60L 2240/423* (2013.01); *B60L 2240/441* (2013.01); *B60L 2240/443* (2013.01); *B60L 2270/145* (2013.01); *B60Y 2300/58* (2013.01); *B60Y 2400/48* (2013.01); *Y02T 10/6217* (2013.01); *Y02T 10/6234* (2013.01); *Y02T 10/642* (2013.01); *Y02T 10/645* (2013.01); *Y02T 10/7077* (2013.01); *Y02T 10/72* (2013.01); *Y02T 10/7275* (2013.01); *Y10S 903/902* (2013.01); *Y10T 477/26* (2015.01)

(56) References Cited

U.S. PATENT DOCUMENTS

| | | | | |
|---|---|---|---|---|
| 7,128,677 B2* | 10/2006 | Supina | ............... | B60K 6/40 475/5 |
| 7,175,555 B2* | 2/2007 | Kozarekar | ............... | B60K 6/22 475/5 |
| 7,276,008 B2* | 10/2007 | Yasui | ............... | B60K 6/365 180/65.25 |
| 7,690,459 B2* | 4/2010 | Schondorf | ............... | B60K 6/365 180/65.275 |
| 8,328,672 B2* | 12/2012 | Akutsu | ............... | B60K 6/365 475/324 |
| 8,500,589 B2* | 8/2013 | Ortmann | ............... | B60K 6/387 475/152 |
| 8,740,739 B2* | 6/2014 | Martin | ............... | B60K 6/547 180/65.265 |
| 8,888,636 B2* | 11/2014 | Ikegami | ............... | B60K 6/365 475/207 |
| 2001/0022245 A1 | 9/2001 | Rogg | | |
| 2003/0183467 A1* | 10/2003 | Kozarekar | ............... | B60K 6/22 188/380 |
| 2004/0112654 A1 | 6/2004 | Kozarekar et al. | | |
| 2004/0121870 A1* | 6/2004 | Takenaka | ............... | B60K 6/26 475/5 |
| 2010/0179010 A1 | 7/2010 | Kazuya et al. | | |

FOREIGN PATENT DOCUMENTS

| | | |
|---|---|---|
| JP | 2009-293652 A | 12/2009 |
| JP | 2010-162969 A | 7/2010 |
| JP | 2010-254230 A | 11/2010 |

OTHER PUBLICATIONS

Japanese Office Action dated Apr. 7, 2014, issued in corresponding Japanese Patent Application No. 2012-556860 with English translation (6 pages).

International Search Report for PCT/JP2012/052523, Mailing Date of Mar. 13, 2012.

Office Action dated May 6, 2015, issued in counterpart Chinese Patent Application No. 201280004842.3 w/English translation (14 pages).

* cited by examiner

DRIVING DEVICE FOR HYBRID VEHICLE

TECHNICAL FIELD

The present invention relates to a driving device for a hybrid vehicle having an engine and a motor.

BACKGROUND ART

Conventionally, a driving device for a hybrid vehicle has an engine and a motor. In addition to an engine as a driving source, such a driving device for hybrid vehicle is equipped with a generator motor mainly for power generation and a traction motor mainly functioning as a driving source of the vehicle.

In the above-mentioned driving device for hybrid vehicle, the engine is started with the driving force of the generator motor. Thus, in addition to a driving force transmission path for driving the vehicle that drives the vehicle by transmitting the driving force of the engine or the traction motor to drive wheels, the driving device for hybrid vehicle has a driving force transmission path for starting the engine that starts the engine by transmitting the driving force of the generator motor to the engine.

However, when starting the engine with the driving force of the generator motor, resonance may occur as the rotational speed of the driving force that is transmitted via the driving force transmission path for starting the engine passes through the natural frequency before reaching the idling speed from the start of the engine. In addition, excessive resonance may occur when this natural frequency overlaps with the natural frequency of support pans (such as a mount) of powertrain, which may generate large vehicle body vibrations due to resonance along with the addition of impact load on each part.

As conventional technologies, devices described in Patent Documents 1 and 2 can prevent the transmission of excessive torque due to the above-mentioned resonance. Patent Document 1 describes a torque fluctuation absorber installed between the output shaft of engine and the input shaft of transmission. This torque fluctuation absorber includes a damper part that absorbs torque fluctuation (or a torque fluctuation absorbing mechanism) and a limiter part that causes slippage when torque fluctuation above a certain value occurs between the output shaft and the input shaft (or a torque limiter mechanism). Patent Document 2 discloses a structure that, in a hybrid vehicle having a driving force transmission path that transmits the driving force of engine and electric motor to the drive wheels, a torque limiter mechanism is arranged inside the rotor of the electric motor installed in the said driving force transmission path, in a hybrid vehicle having the driving force transmission path that transmits the driving force of engine and electric motor to the drive wheels.

CITATION LIST

Patent Document

[PATENT DOCUMENT 1] Japanese Patent Application Publication No. 2009-293652
[PATENT DOCUMENT 2] Japanese Patent Application Publication No. 2010-254230

DISCLOSURE OF THE INVENTION

Problems to be Solved by the Invention

According to the driving device for hybrid vehicle equipped with the torque fluctuation absorber described in Patent Document 1 and the torque limiter mechanism described in Patent Document 2, an excessive torque exceeding an allowable range is not transmitted even when resonance occurs at the time of engine starting by the generator motor, as the torque limiter mechanism operates when a torque due to the said resonance exceeds a predetermined value. Therefore, the parts strength of each part of the driving device can be ensured when resonance occurs. However, since resonance itself that occurs when the engine is started by the generator motor cannot be prevented by these conventional technologies, avoidance or effective reduction of the vehicle body vibrations caused by the said resonance cannot be expected.

Therefore, changing the natural frequency of the driving force transmission path for starting engine by increasing or decreasing spring constant of flywheel damper (or torque fluctuation absorbing mechanism) installed on the output shaft of engine can be considered a measure for avoiding or reducing vehicle body vibrations caused by the above-mentioned resonance. However, there is a problem that vehicle body vibrations due to resonance occur during normal running as the natural frequency of the driving force transmission path exceeds the idling speed of engine when spring constant of flywheel damper is increased. Also, when spring constant of flywheel damper is reduced, the strength necessary for flywheel damper may be insufficient due to the quality of spring material constituting the flywheel damper.

Also, in the above-described driving device for hybrid vehicle, inertial mass (or inertia) of the driving force transmission path for starting engine, and inertial mass of the driving force transmission path for driving vehicle can widely vary. In such case, it is difficult to effectively suppress resonance occurring in each of the above-mentioned multiple driving force transmission paths and vehicle body vibrations due to the said resonance only by means of the torque fluctuation absorbing mechanism or the torque limiter mechanism installed on the output shaft of engine.

Patent Document 1 describes a two-stage flywheel damper equipped with two dampers (ref. FIGS. 9 to 11 of Patent Document 1). However, in such a two-stage flywheel damper, since the natural frequency of the driving force transmission path changes every time when crossing the first and second stage change-points in case of steady operation in the vicinity of the said change-points, the vehicle body vibrations during running may deteriorate. In addition, when this two-stage flywheel damper is installed on the output shaft of engine, the external shape of the driving device increases as the axial dimensions increase, thereby affecting mountability on the vehicle.

Moreover, the torque limiter mechanism described in Patent Document 1 is a dry-type torque limiter mechanism with friction materials for dry-type.

However, in the structure of Patent Document 1, the torque limiter mechanism may grow in size, as the dry-type torque limiter mechanism is installed on a path where rotational speed from engine has not been increased. Further, a wet-type torque limiter mechanism where lubricating oil is supplied to friction material is used in Patent Document 2. However, in a driving device for hybrid vehicle, since a driving device for hybrid vehicle uses lubricating oil based on hydraulic fluid (ATF) with relatively low viscosity for automatic transmission for the purpose of fuel efficiency enhancement, μ-v characteristic of friction material has a positive gradient. In a wet-type torque limiter mechanism under such usage environment, when having reached a specified torque of torque limiter due to resonance and caused slippage, friction coefficient of friction material may increase extremely to generate shocking excessive torque exceeding the specified torque. Therefore, even if the above-mentioned torque limiter mechanism is installed only at a single point on the drive transmission path (for example, on the output shaft of engine), a torque exceeding a specified value may be transmitted downstream the torque limiter mechanism.

In view of the problems, the present invention has an object to provide a driving device for hybrid vehicle that can, with a simple structure, avoid the occurrence of resonance in the driving force transmission path and prevent or effectively suppress vehicle body vibrations due to the said resonance.

Means for Resolving the Problems

In order to solve the problem described above, the present invention includes: in a driving device for hybrid vehicle having an engine (50) and a motor (60); a first driving force transmission path (T1) that transmits driving force of the engine (50) to drive wheels (47) of vehicle; a second driving force transmission path (T2) that transmits driving force between the motor (60) and the engine (50); a first torque fluctuation absorbing mechanism (55) that can absorb torque fluctuations on the first driving force transmission path (T1); and a second torque fluctuation absorbing mechanism (56) that can absorb torque fluctuations on the second driving force transmission path (T2); wherein, the said driving force is transmitted via both the first torque fluctuation absorbing mechanism (55) and the second torque fluctuation absorbing mechanism (56) when transmitting driving force of the motor (60) to the engine (50) in the second driving force transmission path (T2) at the time of starting the engine (50); and the said driving force is transmitted via the first torque fluctuation absorbing mechanism (55), out of the first torque fluctuation absorbing mechanism (55) and the second torque fluctuation absorbing mechanism (56), when transmitting driving force of the engine (50) to the drive wheels (47) in the first driving force transmission path (T1) while a vehicle is running.

Also, this driving device for hybrid vehicle; wherein the above-mentioned motor (60) is the first motor (60) that can generate power by driving force of the engine (50); further includes a second motor (70) that can supply driving force to the drive wheels (47) and a third driving force transmission path (T3) that transmits driving force of the said second motor (70) to the drive wheels (47); and also includes a third torque fluctuation absorbing mechanism (57) that can absorb torque fluctuations on the third driving force transmission path (T3); and this driving force should be transmitted via the third torque fluctuation absorbing mechanism (57), out of the first to third torque fluctuation absorbing mechanisms (55-57), when transmitting driving force of the second motor (70) to the drive wheels (47) in the third driving force transmission path (T3) while a vehicle is running.

Further, the present invention includes, in the driving device for hybrid vehicle having the engine (50); the first motor (60) that can generate power by driving force of the engine (50); and the second motor (70) that can supply driving force to drive wheels (47) of vehicle; the first driving force transmission path (T1) that transmits driving force of the engine (50) to the drive wheels (47); the second driving force transmission path (T2) that transmits driving force between the first motor (60) and the engine (50); the third driving force transmission path (T3) that transmits driving force of the second motor (70) to the drive wheels (47); the first torque fluctuation absorbing mechanism (55) that can absorb torque fluctuations on first driving force transmission path (T1); the second torque fluctuation absorbing mechanism (56) that can absorb torque fluctuations on the second driving force transmission path (T2); and the third torque fluctuation absorbing mechanism (57) that can absorb torque fluctuations on the third driving force transmission path (T3); wherein the said driving force is transmitted via the first torque fluctuation absorbing mechanism (55) and the second torque fluctuation absorbing mechanism (56), out of the first to third torque fluctuation absorbing mechanisms (55-57), when transmitting driving force of the first motor (60) to the engine (50) in the second driving force transmission path (T2) at the time of starting the engine (50); the said driving force is transmitted via the first torque fluctuation absorbing mechanism (55), out of the first to third torque fluctuation absorbing mechanisms (55-57), when transmitting driving force of the engine (50) to the drive wheels (47) in the first driving force transmission path (T1) while a vehicle is running; and the said driving force is transmitted via the third torque fluctuation absorbing mechanism (57), out of the first to third torque fluctuation absorbing mechanisms (55-57), when transmitting driving force of the second motor (70) to the drive wheels (47) in the third driving force transmission path (T3) while a vehicle is running.

According to the driving device for hybrid vehicle in accordance with the present invention, the second torque fluctuation absorbing mechanism that can absorb torque fluctuations on the second driving force transmission path transmitting driving force between the motor and the engine is provided, in addition to the first torque fluctuation absorbing mechanism that can absorb torque fluctuations on the first driving force transmission path transmitting driving force of the engine to the drive wheels of vehicle, which can avoid occurrence of resonance in the second driving force transmission path that transmits driving force of the motor to the engine when starting the engine with the motor. Thus, vehicle body vibrations due to the said resonance can be prevented, and occurrence of vehicle body vibrations and noise when starting the engine can be effectively suppressed.

In addition, according to this driving device for hybrid vehicle, natural frequencies of each driving force transmission path can be set in each torque fluctuation absorbing mechanism by installing a torque fluctuation absorbing mechanism in each driving force transmission path. Therefore, characteristics of each torque fluctuation absorbing mechanism appropriate for each driving mode with which driving force is transmitted via each driving force transmission path can be set easily. Thus, since transient resonance phenomenon in each driving mode where driving force is transmitted in each driving force transmission path can be avoided, vehicle body vibrations generated due to resonance can be prevented or effectively suppressed. Further, reduction in size of each torque fluctuation absorbing mechanism and simplification in structure can be achieved by dispersedly installing in multiple positions the torque fluctuation absorbing mechanisms for absorbing fluctuations in the torque transmitted by the driving device.

Therefore, degree of freedom of arrangement structure of component parts including torque fluctuation absorbing mechanisms with which driving device for hybrid vehicle is equipped can be enhanced.

In addition, in this driving device for hybrid vehicle, even with a structure significantly different in inertial mass (or inertia) of each driving force transmission path, resonance that occurs when driving force is transmitted in the driving force transmission path and vehicle body vibrations due to the said resonance can be effectively suppressed by each torque fluctuation absorbing mechanism installed in each driving force transmission path.

In addition, in this driving device for hybrid vehicle, a torque fluctuation absorbing mechanism that is installed in each driving force transmission path can effectively absorb torque fluctuations of each driving force transmission path even when shocking torque is input from the drive wheels side depending on the condition of road surface on which the vehicle travels.

Further, in this driving device for hybrid vehicle, the torque fluctuation absorbing mechanism that is installed in each driving force transmission path can prevent resonance between support parts (such as a mount) for supporting the driving device on the vehicle body frame side and transient resonance due to input of shocking torque from the drive wheels (or the traveled road surface) at the time of travelling on rough road. Therefore, a torque limiter mechanism with the conventional structure shown in Patent Document 1 and 2 need not be installed. Also, the driving device for hybrid vehicle in accordance with the present invention can be composed at lower cost, as the torque fluctuation absorbing mechanism of the present invention, which can be composed with flywheel dampers, etc., can adopt a relatively inexpensive configuration, whereas the torque limiter mechanism that uses friction material is relatively expensive.

Moreover, in the above-mentioned driving device for hybrid vehicle, a speed reduction mechanism part (10) that slows down the rotation of the first motor (60) to be transmitted to the engine (50) side is provided in the second driving force transmission path (T2), and the second torque fluctuation absorbing mechanism (56) should be arranged between the first motor (60) and the speed reduction mechanism part (10) on the second driving force transmission path (T2).

Since the torque before deceleration of rotation of the first motor is less compared to after deceleration, if the second torque fluctuation absorbing mechanism is, as mentioned above, arranged between the first motor and the speed reduction mechanism part on the second driving force transmission path, the second torque fluctuation absorbing mechanism receives relatively less torque before the deceleration. As a result, torque fluctuations of the second driving force transmission path can be effectively absorbed, attempting reduction in capacity and simplification of structure of the second torque fluctuation absorbing mechanism. Further, mountability of the second torque fluctuation absorbing mechanism on the driving device can be improved by reduction in size and simplification of structure of the second torque fluctuation absorbing mechanism.

Further, the above-mentioned driving device for hybrid vehicle should include at least either one of the torque limiter mechanism (58) that is installed in series with the second torque fluctuation absorbing mechanism (56) on the second driving force transmission path (T2) and can block a torque equal to or greater than a predetermined value transmitted on the said second driving force transmission path (T2), or the torque limiter mechanism (59) that is installed in series with the third torque fluctuation absorbing mechanism (57) on the third driving force transmission path (T3) and can block a torque equal to or greater than a predetermined value transmitted by the said third driving force transmission path (T3).

According to this configuration, a torque equal to or greater than a predetermined value transmitted via the second driving force transmission path or the third driving force transmission path can be blocked by parallel providing a torque limiter mechanism in at least either one of the second torque fluctuation absorbing mechanism or the third torque fluctuation absorbing mechanism. As a result, application of excessive torque exceeding an allowable range to the component parts of the driving device can be prevented, and thus damage to parts can be prevented. Further, since a torque equal to or greater than a predetermined value can be blocked, the structure of each part of the driving device can also be simplified and reduced in size.

Further, in the above-mentioned driving device for hybrid vehicle, at least either one of the second torque fluctuation absorbing mechanism (56) or the third torque fluctuation absorbing mechanism (57) should be arranged on the inner diameter side of rotors (60a, 70a) on rotating shafts (2a, 2b) on which the rotors (60a, 70a) of the first motor (60) or the second motor (70) are fixed.

According to this configuration, since the second torque fluctuation absorbing mechanism or the third torque fluctuation absorbing mechanism can be arranged on the inner diameter side of the first motor (60) or second motor (70), separate installation space needs not be secured for the second torque fluctuation absorbing mechanism or the third torque fluctuation absorbing mechanism. In addition, even when providing the second torque fluctuation absorbing mechanism or the third torque fluctuation absorbing mechanism, there is no need to extend axial dimensions of the rotating shaft on which the rotor of the first motor or the second motor is fixed. Therefore, the second and third torque fluctuation absorbing mechanisms can be installed without increasing the size of outer dimensions of the driving device. It is noted that the above characters in parentheses represent, by way of example, reference characters of components of embodiments to be described herein later.

Effects of the Invention

A driving device for hybrid vehicle according to the present invention can, with a simple structure, avoid resonance that occurs in a driving force transmission path, and can prevent or suppress vehicle body vibrations due to the said resonance.

EMBODIMENTS OF THE INVENTION

Hereinafter, embodiments of the present invention will be described in detail with reference to the appending drawings.

First Embodiment

Figure 1:
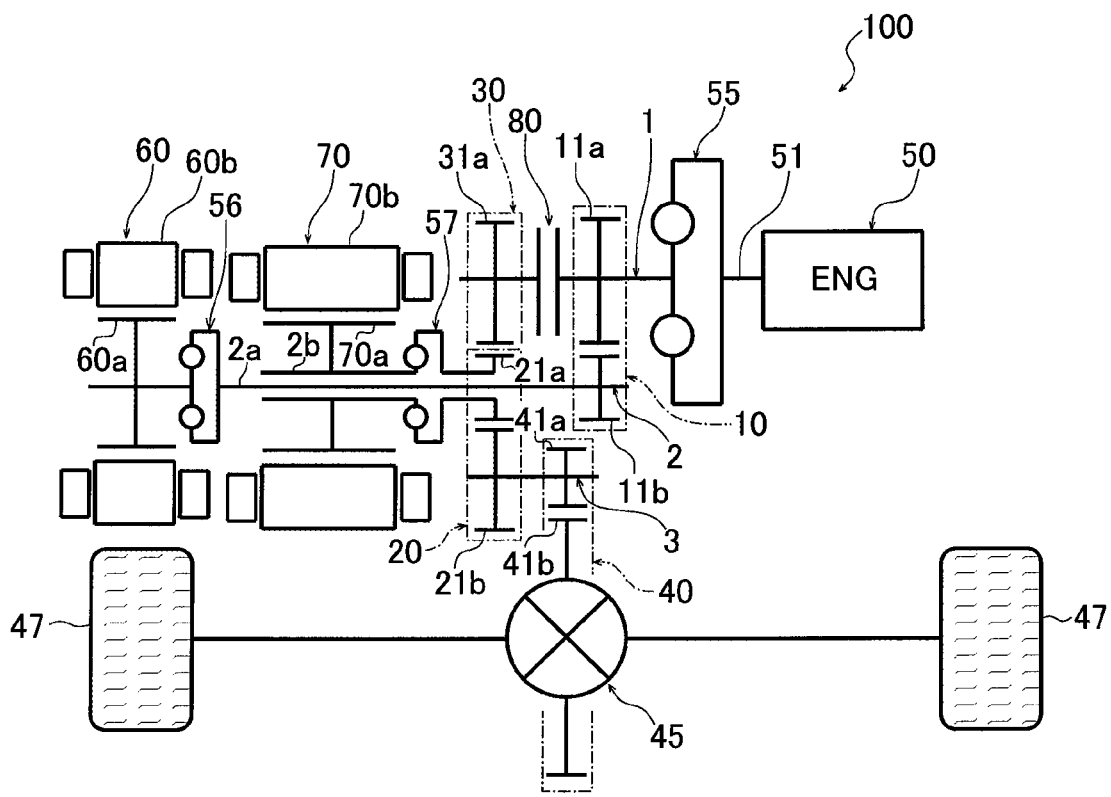
FIG. 1 is a skeleton diagram illustrating a schematic configuration of a driving device for hybrid vehicle in accordance with a first embodiment of the present invention.

FIG. 1 is a skeleton diagram of a driving device for hybrid vehicle 100 in accordance with a first embodiment of the present invention. The driving device 100 shown in the same figure is a hybrid type driving device comprising an engine 50 as a driving source, a generator motor (or a first motor) 60 mainly for generating power, and a traction motor (or a second motor) 70 mainly for driving of the vehicle.

In addition to the above configuration, the driving device 100 comprises an engine shaft 1, a generator shaft 2, and an idler shaft 3 that are installed in parallel to each other. The engine shaft 1 is arranged side-by-side coaxially with a crankshaft (or an output shaft) 51 of the engine 50. Driving force of the crankshaft 51 is transmitted to the engine shaft 1 via a first flywheel damper (or a first torque fluctuation absorbing mechanism) 55. An output gear 11a that constitutes a gear train for generator drive 10 to be described later and an output gear 31a that constitutes an engine driving force transmitting gear train 30 to be described later are installed on the engine shaft 1.

The output gear 11a and the output gear 31a are fixed on the engine shaft 1 so as to rotate integrally with the engine shaft 1. A clutch (or a frictional engagement mechanism) 80 for switching presence and absence of transmission of driving force to the output gear 31a from the engine 50 is installed between the output gear 11a and the output gear 31a on the engine shaft 1.

Further, a generator shaft 2 is a two-tier rotating shaft comprising an inner circumferential shaft 2a and an outer circumferential shaft 2b that is arranged on the outer peripheral side concentrically with respect to the inner circumferential shaft 2a. An input gear 11b that meshes with the output gear 11a on the engine shaft 1 is installed on the inner circumferential shaft 2a. The gear train for generator drive 10 for transmitting driving force between the engine shaft 1 and the inner circumferential shaft 2a comprises the output gear 11a on the engine shaft 1 and the input gear 11b on the inner circumferential shaft 2a. The gear train for generator drive 10 functions, in a second driving force transmission path T2 that will be described later, as a speed reduction mechanism part that decelerates rotation of the generator motor 60 so as to transmit to an engine 50 side.

Furthermore, the generator motor 60 is installed on the inner circumferential shaft 2a. The generator motor 60 is configured to comprise a rotor 60a that is fixed on the inner circumferential shaft 2a and rotates integrally with the inner circumferential shaft 2a and a stator 60b that is arranged opposite to the rotor 60a. Driving force of the engine shaft 1 is transmitted to the inner circumferential shaft 2a of the generator shaft 2 via the gear train for generator drive 10 so that the rotor 60a can rotate with rotation of the inner circumferential shaft 2a. This enables to convert driving force of the engine 50 into electric power by the generator motor 60. Also, when starting the engine, rotation of the inner circumferential shaft 2a by driving force of the generator motor 60 is transmitted to the engine 50 via the gear train 10 for generator drive. This enables to start the engine 50 by driving force of the generator motor 60.

An output gear 21a that meshes with an input gear 21b on the idler shaft 3 is installed on one end of the outer circumferential shaft 2b. Further, the traction motor 70 is installed on the other end of the outer circumferential shaft 2b. The traction motor 70 is configured to comprise a rotor 70a fixed on the outer circumferential shaft 2b and a stator 70b that is arranged opposite to the rotor 70a.

A motor driving force transmitting gear train 20 that transmits driving force of the outer circumferential shaft 2b to the idler shaft 3 comprises the output gear 21a on the outer circumferential shaft 2b and the input gear 21b on the idler shaft 3. Therefore, when the outer circumferential shaft 2b rotates by driving force of the traction motor 70, the rotation is transmitted to the idler shaft 3 via the motor driving force transmitting gear train 20.

Further, an output gear 41a that meshes with an input gear 41b of a differential mechanism 45 and the input gear 21b that meshes with the output gear 31a on the engine shaft 1 and the output gear 21a on the outer circumferential shaft 2b are installed on the idler shaft 3, sequentially from a side closer to the engine 50. An engine driving force transmitting gear train 30 that transmits driving force of the engine shaft 1 to the idler shaft 3 comprises an output gear 31a on the engine shaft 1 and the input gear 21b on the idler shaft 3. In addition, a final gear train 40 that transmits driving force of the idler shaft 3 to the differential mechanism 45 comprises the output gear 41a on the idler shaft 3 and the input gear 41b of the differential mechanism 45.

Figure 2:
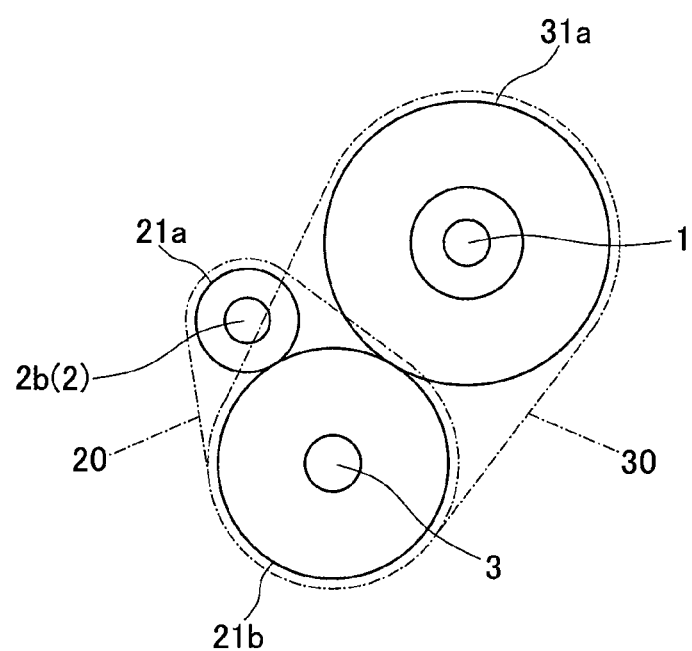
FIG. 2 is a diagram illustrating positional relationship between an engine driving force transmitting gear train and a motor driving force transmitting gear train to schematically show an engagement state of each gear as viewed from an axial direction.

FIG. 2 is a diagram for describing positional relationship between the motor driving force transmitting gear train 20 and the engine driving force transmitting gear train 30 to schematically show an engagement state of each gear as viewed from an axial direction.

As shown in the same figure, both the output gear 31a of the engine driving force transmitting gear train 30 installed on the engine shaft 1 and the output gear 21a of the motor driving force transmitting gear train 20 installed on the outer circumferential shaft 2b of the generator shaft 2 mesh with the input gear 21b of the idler shaft 3. Thus, as the output gear 31a and the output gear 21a mesh with the input gear 21b on the idler shaft 3, the input gear 21b on idler shaft 3 is shared by the engine driving force transmitting gear train 30 and the motor driving force transmitting gear train 20. This enables to input both driving force from the output gear 31a of the engine driving force transmitting gear train 30 and driving force from the output gear 21a of the motor driving force transmitting gear train 20 to the same input gear 21b on the idler shaft 3.

Driving force of the traction motor 70 input to the idler shaft 3 via the motor driving force transmitting gear train 20 and driving force of the engine 50 input to the idler shaft 3 via the engine driving force transmitting gear train 30 are transmitted to the differential mechanism 45 via the final gear train 40 and transmitted to the drive wheels 47, 47 by means of the differential mechanism 45.

Then, as a mechanism for absorbing fluctuations in torque transmitted via each driving force transmission path that will be described later, the driving device 100 of the present embodiment comprises: a first flywheel damper (or a first torque fluctuation absorbing mechanism) 55 installed between the crankshaft 51 and the engine shaft 1 of the engine 50; a second flywheel damper (or a second torque fluctuation absorbing mechanism) 56 installed between the generator motor 60 on the inner circumferential shaft 2a and the input gear 11b of the gear train for generator drive 10; and a third flywheel damper (or a third torque fluctuation absorbing mechanism) 57 installed between the traction motor 70 on the outer circumferential shaft 2b and the output gear 21a of the motor driving force transmitting gear train 20. Any of the first, second, and third flywheel dampers 55, 56, 57 is a mechanism functioning as both a flywheel with an inertial mass and a damper to absorb torque fluctuations. The first flywheel damper 55 can absorb fluctuations in torque transmitted between the crankshaft 51 and the engine shaft 1, the second flywheel damper 56 can absorb fluctuations in torque transmitted between the generator motor 60 and the input gear 11b on the inner circumferential shaft 2a, and the third flywheel damper 57 can absorb fluctuations in torque transmitted between the traction motor 70 and the output gear 21a on the outer circumferential shaft 2b.

Figure 3:
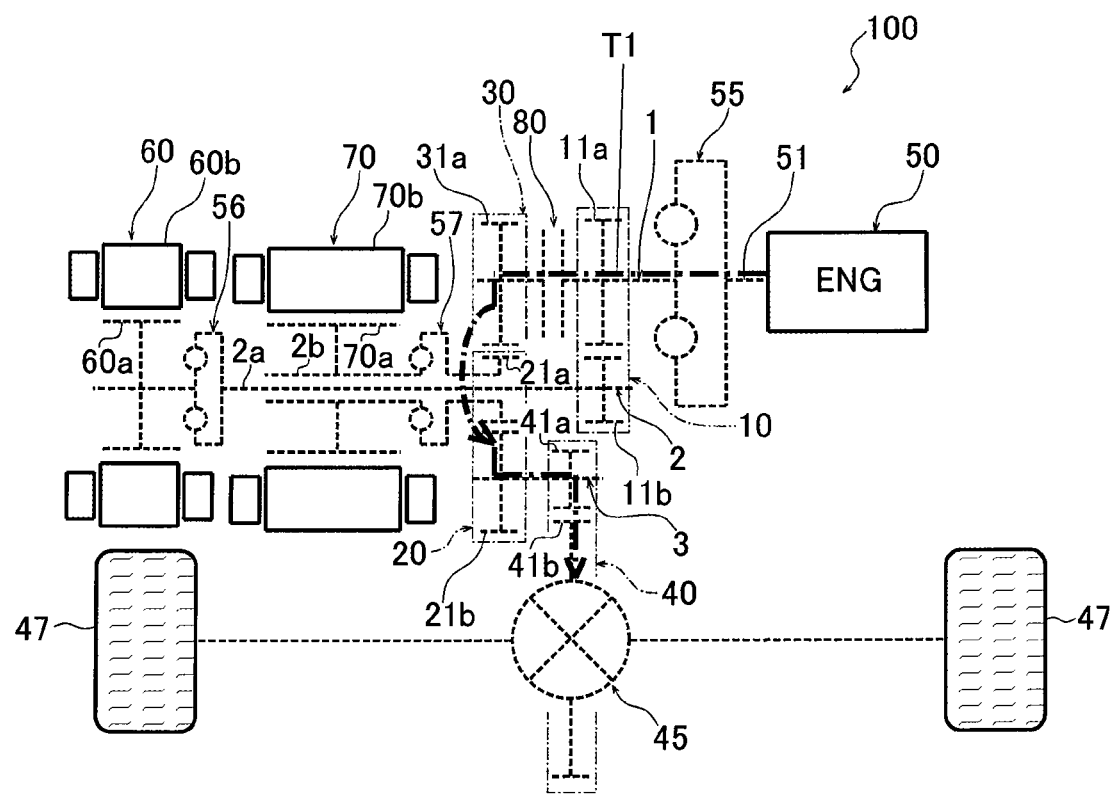
FIG. 3 is a diagram illustrating a first driving force transmission path.
Figure 4:
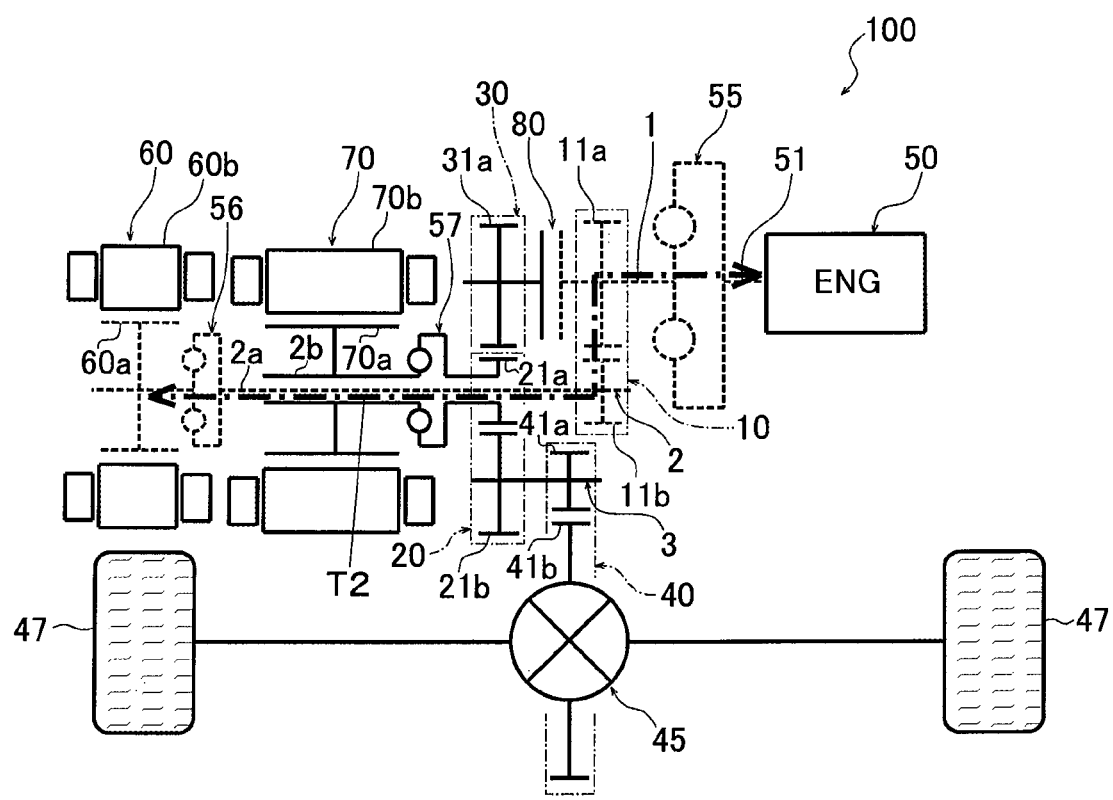
FIG. 4 is a diagram illustrating a second driving force transmission path.
Figure 5:
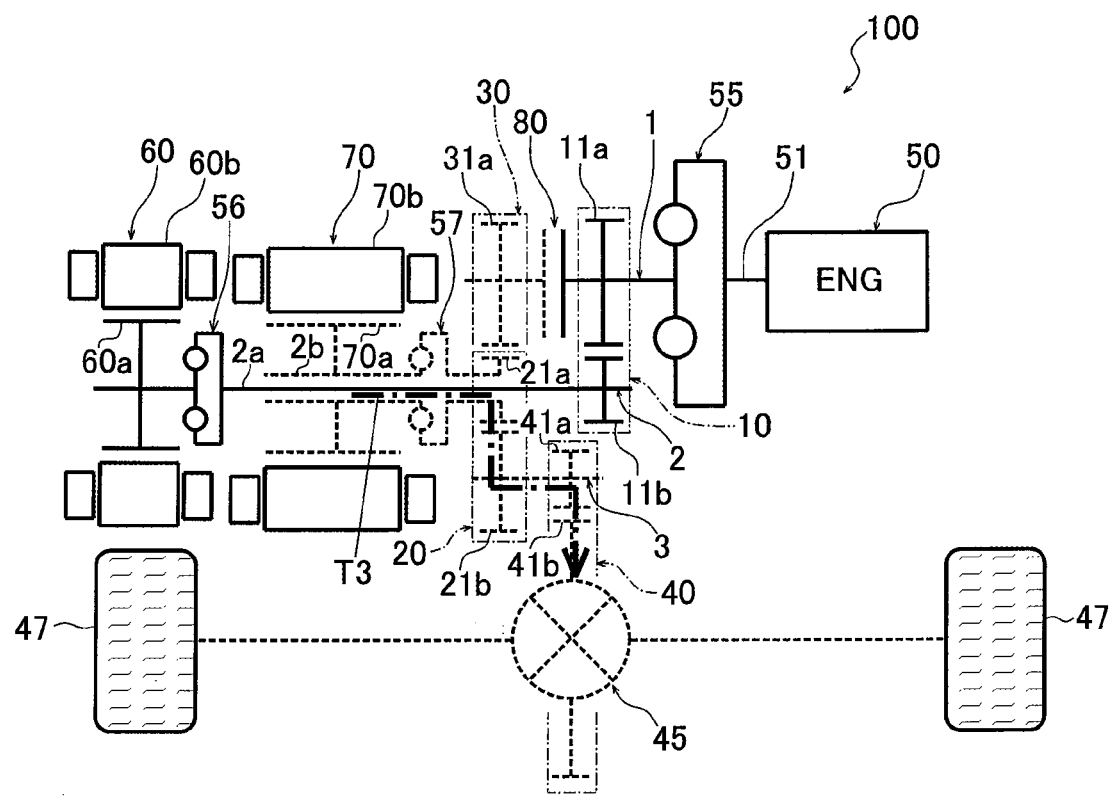
FIG. 5 is a diagram illustrating a third driving force transmission path.

Next, driving force transmission paths that the driving device for hybrid vehicle 100 has will be explained. The driving device for hybrid vehicle 100 has a driving force transmission path that transmits driving force of the engine 50 to the drive wheels 47, 47 (hereinafter, referred to as "first driving force transmission path") T1; a driving force transmission path that transmits driving force between the generator motor 60 and the engine 50 (hereinafter, referred to as "second driving force transmission path") T2; and a driving force transmission path that transmits driving force of the traction motor 70 to drive wheels 47, 47 (hereinafter, referred to as "third driving force transmission path") T3. FIGS. 3 to 5 are diagrams illustrating the first to third driving force transmission paths T1-T3.

The figures show, with dotted lines, components that rotate when driving force is transmitted via the first to third driving force transmission paths T1-T3.

In the first driving force transmission path T1 shown in FIG. 3, depending on engagement of the clutch 80, driving force is transmitted in a path of the engine 50→the crankshaft 51→the first flywheel damper 55→the engine shaft 1→the clutch 80→the engine driving force transmitting gear train 30→the idler shaft 3→the final gear train 40→the differential mechanism 45→the drive wheels 47, 47.

Also, when driving force is transmitted via the first driving force transmission path T1, simultaneously the output gear 11a of the gear train for generator drive 10 rotates along with the engine shaft 1. As a result, driving force of the engine 50 is transmitted in a path of the gear train for generator drive 10→the inner circumferential shaft 2a→the second flywheel damper 56→the rotor 60a (or the generator motor 60). In addition, the input gear 21b rotates due to driving force from the output gear 31a, whereby the output gear 21a of the motor driving force transmitting gear train 20 that meshes with the input gear 21b rotates. Thus, the outer circumferential shaft 2b and the rotor 70a of the traction motor 70 are in so-called concomitant rotation (or drag) state.

In addition, when transmitting driving force in the first driving force transmission path T1, the input gear 21b on the idler shaft 3 rotates due to driving force from the output gear 31a on the engine shaft 1, thereby rotating the output gear 21a on the outer circumferential shaft 2b that meshes with the input gear 21b. And, the rotation of the output gear 21a is transmitted to the rotor 70a on the outer circumferential shaft 2b via the third flywheel damper 57, thereby rotating the rotor 70a. Therefore, the traction motor 70 can generate power utilizing rotation of the rotor 70a.

In the second driving force transmission path T2 shown in FIG. 4, when starting the engine 50 with driving force of the generator motor 60, driving force is transmitted in a path of the generator motor 60→the inner circumferential shaft 2a→the second flywheel damper 56→the gear train for generator drive 10→the engine shaft 1→the first flywheel damper 55→the crankshaft 51→the engine 50. On the other hand, when generating power by the generator motor 60 with driving force of engine 50, driving force is transmitted in a path opposite to the above-described path: the engine 50 the crankshaft 51→the first flywheel damper 55→the engine shaft 1→the gear train for generator drive 10→the second flywheel damper 56→the inner circumferential shaft 2a→the generator motor 60.

In the third driving force transmission path T3 shown in FIG. 5, the driving force is transmitted in a path of the traction motor 70→the outer circumferential shaft 2b→the third flywheel damper 57→the motor driving force transmitting gear train 20→the idler shaft 3→the final gear train 40→the differential mechanism 45→the drive wheels 47, 47.

In addition, when driving force is transmitted via the third driving force transmission path T3, the input gear 21b rotates due to driving force from the output gear 21a, thereby rotating the output gear 31a of the engine driving force transmitting gear train 30 that meshes with the input gear 21b. As a result, the output gear 31a downstream of the clutch 80 as viewed from the engine 50 (or on a traction motor 70 side) is in so-called concomitant rotation (or drag) state.

In the driving device for hybrid vehicle 100, when starting the engine 50, the engine can be started by transmitting driving force of the generator motor 60 to the engine 50 via the second driving force transmission path T2. Further, while a vehicle is running, depending on a running state, the vehicle is driven by using the first driving force transmission path T1 and the third driving force transmission path T3 either selectively or together. Specifically, switching engagement/disengagement of the clutch 80 provided between the engine shaft 1 and the output gear 31a enables to switch setting of whether to use the first driving force transmission path T1 and the third driving force transmission path T3 selectively or together.

To explain this point in detail, in a state that the clutch 80 is disconnected, driving force of the engine shaft 1 is not transmitted to the engine driving force transmitting gear train 30. In this state, a vehicle can be driven by transmitting driving force of the traction motor 70 to the drive wheels 47, 47 via the third driving force transmission path T3. In other words, the outer circumferential shaft 2b of the generator shaft 2 rotates by driving force of the traction motor 70, thereby transmitting the rotation to the idler shaft 3 via the motor driving force transmitting gear train 20. Driving force of the traction motor 70 that has been thus transmitted is transmitted to the drive wheels 47, 47 via the final gear train 40 and the differential mechanism 45. Also at this time, driving force of the engine 50 is input to the inner circumferential shaft 2a, by way of the gear train for generator drive 10, from the engine shaft 1 via the second driving force transmission path T2 so that the inner circumferential shaft 2a can rotate. As a result, the rotor 60a on the inner circumferential shaft 2a rotates to generate power with the generator motor 60. Electric power generated by the generator motor 60 is accumulated in the electric power storage device, which is not shown. Then, the stored electric power drives the traction motor 70. This enables a so-called series operation that is performed by converting all the driving force of the engine 50 to electricity using the generator motor 60. Further, in addition, a driving mode that drives the traction motor 70 by directly supplying electric power generated by the generator motor 60 to the traction motor 70 without accumulating into the electric power storage device is also possible.

On the other hand, in a state that the clutch 80 is engaged, the output gear 31a connects directly to the engine shaft 1 resulting in lockup state. This state enables to drive a vehicle by transmitting driving force of the engine 50 to the drive wheels 47, 47 via the first driving force transmission path T1. That is, by engaging the clutch 80, driving force of engine shaft 1 is transmitted to idler shaft 3 via the engine driving force transmitting gear train 30, and further transmitted to drive wheels 47, 47 via the final gear train 40 and the differential mechanism 45. Also, in this state, rotation of the engine shaft 1 is transmitted to the inner circumferential shaft 2a by way of the gear train for generator drive 10 via the second driving force transmission path T2, thereby rotating the rotor 60a of the generator motor 60. Therefore, since the generator motor 60 can generate power, so-called parallel operation to rotate the traction motor 70 with the generated power is also possible. Also, drag loss can be minimized by performing zero torque control over the traction motor 70 and the generator motor 60, enabling driving only with the engine 50. It is noted that, although detailed explanation of driving modes other than the above is omitted here, the above-described driving modes are examples, and the driving device for hybrid vehicle 100 of the present embodiment also enables to drive in driving modes other than the above.

In the driving device for hybrid vehicle 100 of the present embodiment, when driving force of the generator motor 60 is transmitted to the engine 50 in the second driving force transmission path T2 at a time of starting the engine 50, torque fluctuations of the second driving force transmission path T2 are absorbed by both the first flywheel damper 55 and the second flywheel damper 56, as the driving force is transmitted via both the first flywheel damper 55 and the second flywheel damper 56. Also, when transmitting driving force of the engine 50 to the drive wheels 47 in the first driving force transmission path T1 while vehicle is running in a state that the clutch 80 is engaged, torque fluctuations of the first driving force transmission path T2 are absorbed by the first flywheel damper 55, as the driving force is transmitted via the first flywheel damper 55. Also, when transmitting driving force of the traction motor 70 to the drive wheels 47 in the third driving force transmission path T3, torque fluctuations of the third driving force transmission path T3 are absorbed by the third flywheel damper 57, as the driving force is transmitted via the third flywheel damper 57.

Thus, by providing the second flywheel damper 56 on the driving force transmission path T2 in addition to the first flywheel damper 55 on the first driving force transmission path T1, the driving device for hybrid vehicle 100 of the present embodiment enables to avoid occurrence of resonance in the second driving force transmission path T2 that transmits driving force of the generator motor 60 to the engine 50 at a time of starting the engine 50 with the generator motor 60. Therefore, vehicle body vibrations caused by the resonance can be prevented. This enables effective reduction of vehicle body vibrations and noise at a time of starting the engine 50.

Further, according to the driving device for hybrid vehicle 100, natural frequencies of the first to third driving force transmission paths T1-T3 can be set respectively in the first to third flywheel dampers 55-57 by installing the first to third flywheel dampers 55-57 in the first to third driving force transmission paths T1-T3 respectively. This enables easy set-up of characteristics suitable to each of the driving modes where driving force are transmitted in the first to third driving force transmission paths T1-T3 respectively to the first to third flywheel dampers 55-57. Therefore, transient resonance phenomenon in each driving mode where driving force is transmitted in each of the first to third driving force transmission paths T1-3 can be avoided, which enables prevention or effective reduction of vehicle body vibrations caused by resonance.

Also, in the driving device for hybrid vehicle 100, the first to third flywheel dampers 55-57 are installed dispersedly in multiple positions as a torque fluctuation absorbing mechanism for absorbing fluctuations in torque transmitted in each of the driving force transmission paths T1-T3 so that each of the first to third flywheel dampers 55-57 can be reduced in size and simplified in structure. Therefore, this enables to increase a degree of freedom of arrangement structure of component parts including the first to third flywheel dampers 55-57 that the driving device for hybrid vehicle 100 comprises.

Further, in the driving device for hybrid vehicle 100, each inertial mass (or inertia) of the first to third driving force transmission paths T1-T3 is greatly different. However, the first to third flywheel dampers 55-57 installed respectively in the first to third driving force transmission paths T1-T3 enable effective suppression of resonance that occurs when driving force is transmitted in the first to third driving force transmission paths T1-T3 respectively and vehicle body vibrations caused by the resonance.

In addition, in the driving device for hybrid vehicle 100, the flywheel dampers 55-57 are installed respectively in the driving force transmission paths T1-T3, which enables to prevent occurrence of resonance in each of the driving force transmission paths T1-T3 even when shocking driving force is input from a drive wheels 47 side depending on a condition of road surface where a vehicle runs.

In addition, in the driving device for hybrid vehicle 100, the flywheel dampers 55-57 are installed respectively in the driving force transmission paths T1-T3, which enables to prevent resonance with support parts (such as a mount) for supporting the driving device 100 on body frame and transient resonance due to input of shocking driving force from drive wheels 47 side occurring when transitioning from a road surface with low coefficient of friction to one with high coefficient of friction (or so-called μ jump) or when travelling on a rough road. Therefore, a torque limiter mechanism such as ones in conventional structure shown described in Patent Documents 1 and 2 needs not be installed. Also, to such extent as the flywheel damper composing the first to third flywheel dampers 55-57 is inexpensive compared to a torque limiter mechanism that uses friction material, etc., the driving device 100 can be configured inexpensively.

In addition, in the driving device for hybrid vehicle 100, the gear train for generator drive 10 (or the speed reduction mechanism part) that slows down rotation of the motor 60 to transmit to an engine 50 side is provided in the second driving force transmission path T2. And, the second flywheel damper 56 is arranged between the generator motor 60 and the gear train for generator drive 10 on the second driving force transmission path T2.

Since a torque before deceleration of rotation of the generator motor 60 is less compared to a torque after deceleration, if the second flywheel damper 56 that is installed in the second driving force transmission path T2 is arranged between the generator motor 60 and the gear train for generator drive 10, as mentioned above, the second flywheel damper 56 receives relatively less torque before deceleration. Thus, torque fluctuations of the second driving force transmission path T2 that occurs when starting the engine 50 can be effectively absorbed while achieving reduction in capacity and simplification in structure of the second flywheel damper 56. Further, mountability of the second flywheel damper 56 on the driving device 100 can be improved by reduction in size and simplification of the second flywheel damper 56.

On the other hand, when generating power with the generator motor 60, driving force of the engine 50 is transmitted in the second driving force transmission path T2 in a direction opposite to that described above. In that case, the gear train for generator drive 10 accelerates rotation of the engine 50 to be transmitted to a generator motor 60 side. As torque after acceleration of rotation of the engine 50 is less compared to before acceleration of rotation of the engine 50, at a time of power generation, the second flywheel damper 56 receives torque after acceleration. This enables to decrease capacity and simplify structure of the second flywheel damper 56.

Also, in the driving device for hybrid vehicle 100 of the present embodiment, as described above, when driving force is transmitted via the first driving force transmission path T1, the input gear 21b on the idler shaft 3 rotates by driving force of the output gear 31a on the engine shaft 1, thereby rotating the output gear 21a on the outer circumferential shaft 2b that meshes with the input gear 21b and the rotation is transmitted to the rotor 70a on the outer circumferential shaft 2b via the third flywheel damper 57, thereby rotating the rotor 70a of the traction motor 70. Then, in the rotation transmission path, rotation of the engine shaft 1 is accelerated and transmitted to an outer circumferential shaft 2b side in a path of the output gear 31a→the input gear 21b→the output gear 21a. Thus, the third flywheel damper 57 is installed downstream of the acceleration gear train as viewed from an engine shaft 1 side, and when rotation of the engine 50 is transmitted to the third flywheel damper 57, rotation after acceleration is transmitted. This enables to decrease capacity and simplify structure of the third flywheel damper 57.

Also, the second flywheel damper 56 and the third flywheel damper 57 can be reduced in size by adopting an above-described configuration, and thus can be installed using free space within the driving device 100. As a specific example, the second flywheel damper 56 can be arranged on an inner diameter side of the rotor 60a on the inner circumferential shaft 2a, on which the rotor 60a of the generator motor 60 is fixed, and the third flywheel damper 57 can be arranged on an inner diameter side of the rotor 70a on the outer circumferential shaft 2b, on which the rotor 70a of traction motor 70 is fixed, detailed illustration of which is not shown in the figure. According to the configuration, since the second flywheel damper 56 or the third flywheel damper 57 can be arranged on an inner diameter side of the generator motor 60 or the traction motor 70, separate installation space needs not be secured within the driving device100 for the second flywheel damper 56 or the third flywheel damper 57. Also, the second and third flywheel dampers 56, 57 can be provided without extending axial dimensions of the inner circumferential shaft 2a on which the rotor 60a of the generator motor 60 is fixed or the outer circumferential shaft 2b on which the rotor 70a of the traction motor 70 is fixed. Therefore, due to installation of the second and third flywheel dampers 56, 57, the driving device 100 needs not be increased in external dimensions.

Further, the second and third flywheel dampers 56, 57 can be arranged inside a case (not shown) of the driving device 100. This enables to supply lubricating, oil (or transmission oil) within the case to the second and third flywheel dampers 56, 57. This enables to improve durability (such as abrasive toughness) of the second and third flywheel dampers 56, 57.

In the driving device 100 of the present embodiment, the flywheel dampers 55-57 are shown as torque fluctuation absorbing mechanisms that are installed respectively in the driving force transmission paths T1-T3. In addition, a torque fluctuation absorbing mechanism that is installed in each of the driving force transmission paths T1-T3 may have a structure that has only a damper part without a flywheel part as long as the structure can absorb torque fluctuations of each of the driving force transmission paths T1-T3. Also, apart from a damper with elastic coil spring or rubber material, a damper part may also be a fluid damper with sealed liquid or gas, as long as the fluid damper has a structure that can absorb torque fluctuations.

Second Embodiment

Next, a second embodiment of the present invention will be described. In the description of the second embodiment and the corresponding figures, like reference characters refer to components corresponding or equivalent to those of the first embodiment and a detailed description thereof is dispensed with. The features other than those described as below are the same as in the first embodiment. The same holds for the other embodiments of the invention.

Figure 6:
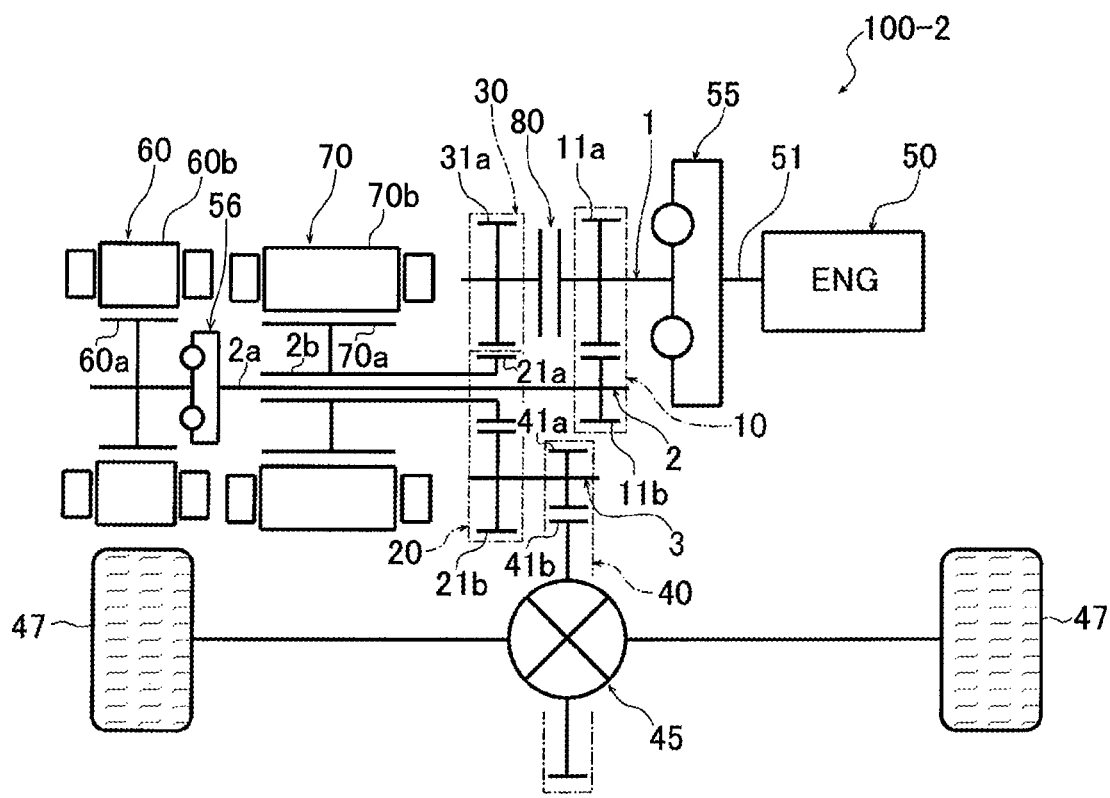
FIG. 6 is a skeleton diagram illustrating a schematic configuration of a driving device for hybrid vehicle in accordance with a second embodiment of the present invention.

FIG. 6 is a skeleton diagram showing a schematic configuration of a driving device for hybrid vehicle in accordance with a second embodiment of the present invention. In the driving device for hybrid vehicle 100-2 shown in the same figure, compared to the driving device for hybrid vehicle 100 of the first embodiment, the third flywheel damper (or the third torque fluctuation absorbing mechanism) 57 provided between the traction motor 70 on the outer circumferential shaft 2b and the output gear 21a of the motor driving force transmitting gear train 20 is omitted. Rest of the configuration is the same as the driving device for hybrid vehicle 100 of the first embodiment.

By providing the second flywheel damper 56 that can absorb torque fluctuations on the driving force transmission path T2 (ref. to FIG. 4), in addition to the first flywheel damper 55 that can absorb torque fluctuations on the first driving force transmission path T1 (ref. to FIG. 3), the driving device for hybrid vehicle 100-2 of the present embodiment enables to avoid occurrence of resonance in the second driving force transmission path T2 when starting the engine 50 with the generator motor 60 and thus to prevent vehicle body vibrations caused by the resonance. This enables effective reduction of vehicle body vibrations and noise when starting the engine 50.

Third Embodiment

Figure 7:
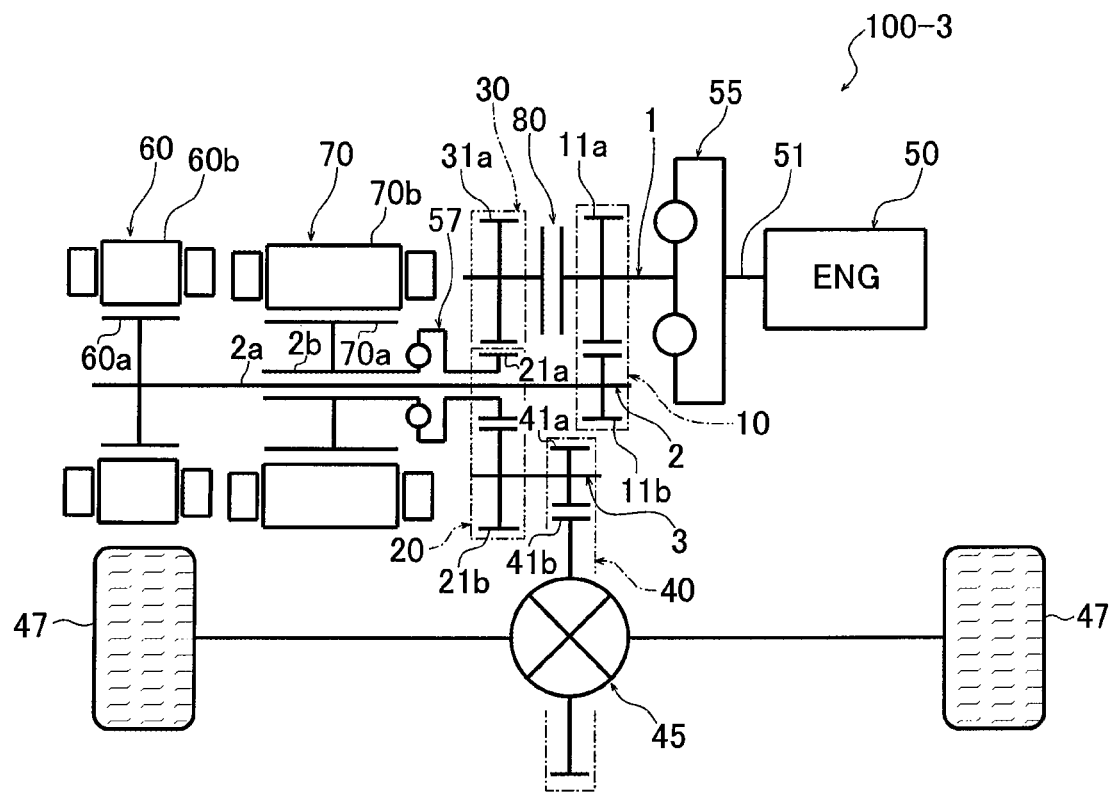
FIG. 7 is a skeleton diagram illustrating a schematic configuration of a driving device for hybrid vehicle in accordance with a third embodiment of the present invention.

Next, a third embodiment of the present invention will be described. FIG. 7 is a skeleton diagram showing a schematic configuration of a driving device for hybrid vehicle in accordance with the third embodiment of the present invention. In the driving device for hybrid vehicle 100-3 shown in the same figure, compared to the driving device for hybrid vehicle 100 of first embodiment, the second flywheel damper (or the second torque fluctuation absorbing mechanism) 56 provided between the generator motor 60 on the inner circumferential shaft 2a and the input gear 11b of the gear train for generator drive 10 is omitted. Rest of the configuration is the same as the driving device 100 of the first embodiment.

In the driving device 100-3 of the present embodiment, the third flywheel damper 57 that can absorb torque fluctuations on the third driving force transmission path T3 (ref to FIG. 5) is provided in addition to the first flywheel damper 55 that can absorb torque fluctuations on the first driving force transmission path T1 (ref to FIG. 3) so that occurrence of resonance in the third driving force transmission path T3 can be avoided, as torque fluctuations of the third driving force transmission path T3 can be absorbed by the third flywheel damper 57 when transmitting driving force of the traction motor 70 to the drive wheels 47 in the third driving force transmission path T3 while a vehicle is running in a state that the clutch 80 is engaged. Thus, vehicle body vibrations caused by the resonance can be avoided. This enables to effectively reduce vehicle body vibrations and noise when running with driving force of the traction motor 70 and also to prevent occurrence of transient resonance caused by torque input from the drive wheels 47 side (or a foot shaft side).

Fourth Embodiment

Figure 8:
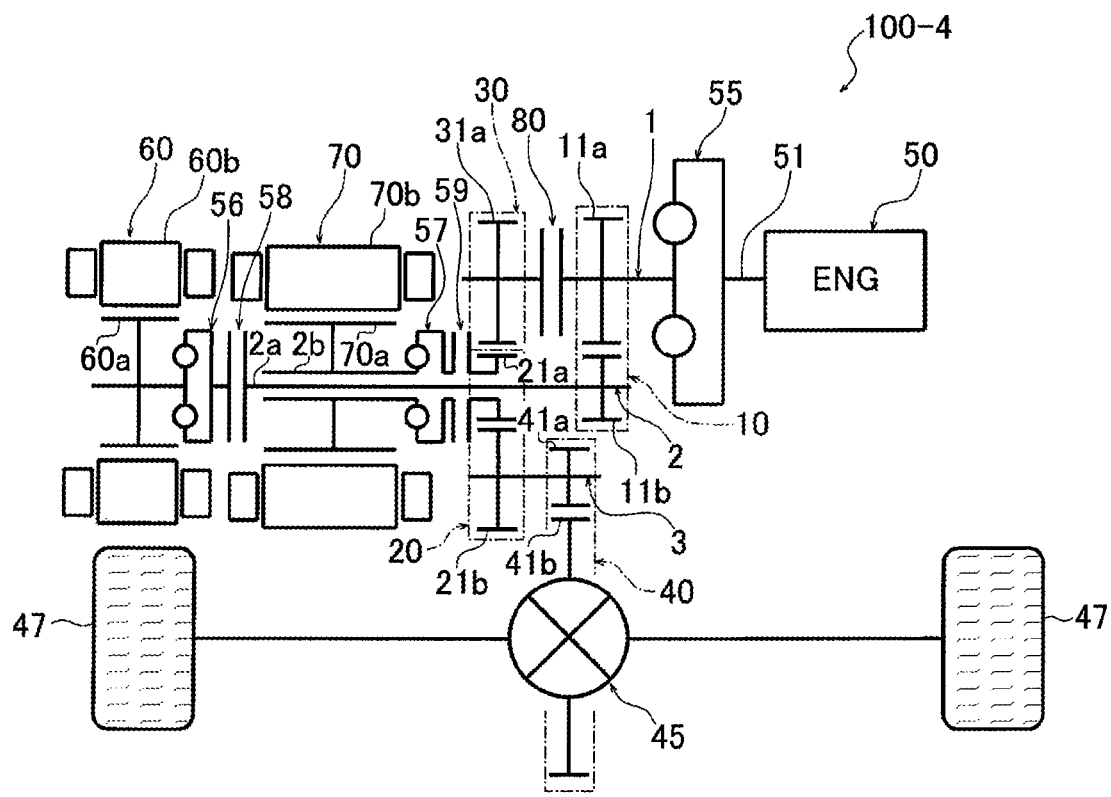
FIG. 8 is a skeleton diagram illustrating a schematic configuration of a driving device for hybrid vehicle in accordance with a fourth embodiment of the present invention.

Next, a fourth embodiment of the present invention will be described. FIG. 8 is a skeleton diagram showing a schematic configuration of a driving device for hybrid vehicle in accordance with the fourth embodiment of the present invention. In addition to the configuration of the driving device 100 of the first embodiment, the driving device for hybrid vehicle 100-4 shown in the same figure comprises a torque limiter (or a torque limiter mechanism) 58 installed in series with the second flywheel damper 56 on the inner circumferential shaft 2a and a torque limiter (or a torque limiter mechanism) 59 arranged in series with the third flywheel damper (or the third torque fluctuation absorbing mechanism) 57 on the outer circumferential shaft 2b. Rest of the configuration is the same as the driving device 100 of the first embodiment.

The torque limiter 58 and the torque limiter 59 are configured to comprise friction material relatively movable in torsional direction (or rotational direction) and have a structure that prohibits transmission of a torque equal to or greater than a preset value in a way that the friction material causes a slip when the torque is input, detailed illustration of which is not shown in the figure. As specific examples of such torque limiters, there are a dry-type torque limiter used in an environment where lubricating oil is not supplied to friction material and a wet-type torque limiter used in an environment where lubricating oil is supplied to friction material.

According to this configuration, a torque equal to or greater than a predetermined value transmitted in the second driving force transmission path T2 or the third driving force transmission path T3 can be blocked by providing the torque limiters 58, 59 respectively in the second and third flywheel dampers 56, 57. This enables to prevent application of excessive torque exceeding an allowable range to component parts of the driving device 100-4 even in a situation that torque fluctuations of the second and third driving force transmission paths T2, T3 increase and enables to prevent damage to parts. Also, since a torque equal to or greater than a predetermined value that is transmitted via the second driving force transmission path T2 or the third driving force transmission path T3 can be blocked, this enable to reduce weight and simplify structure of each part of the driving device 100-4.

In the present embodiment, a case that both the torque limiter 58 and the torque limiter 59 are provided has been described. Also, either one of the torque limiter 58 and the torque limiter 59 can be installed or the other can be omitted.

Fifth Embodiment

Figure 9:
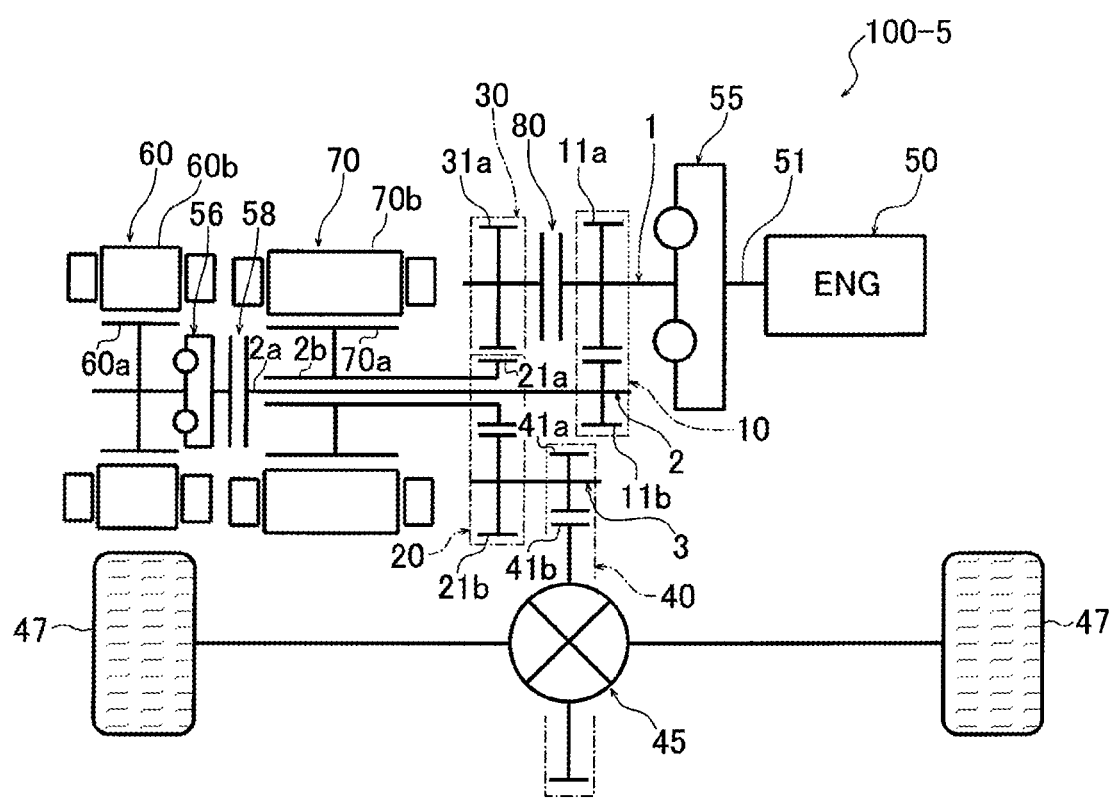
FIG. 9 is a skeleton diagram illustrating a schematic configuration of a driving device for hybrid vehicle in accordance with a fifth embodiment of the present invention.

Next, a fifth embodiment of the present invention will be described. FIG. 9 is a skeleton diagram showing a schematic configuration of a driving device for hybrid vehicle in accordance with a fifth embodiment of the present invention. In the driving device for hybrid vehicle 100-5 shown in the same figure, compared to the driving device for hybrid vehicle 100-4 of the fourth embodiment, the third flywheel damper (or the third torque fluctuation absorbing mechanism) 57 and the torque limiter (or the torque limiter mechanism) 59 that are provided between the traction motor 70 on the outer circumferential shaft 2b and the output gear 21a of the motor driving force transmitting gear train 20 are omitted. Rest of the configuration is same as the driving device of 100-4 the fourth embodiment.

Sixth Embodiment

Figure 10:
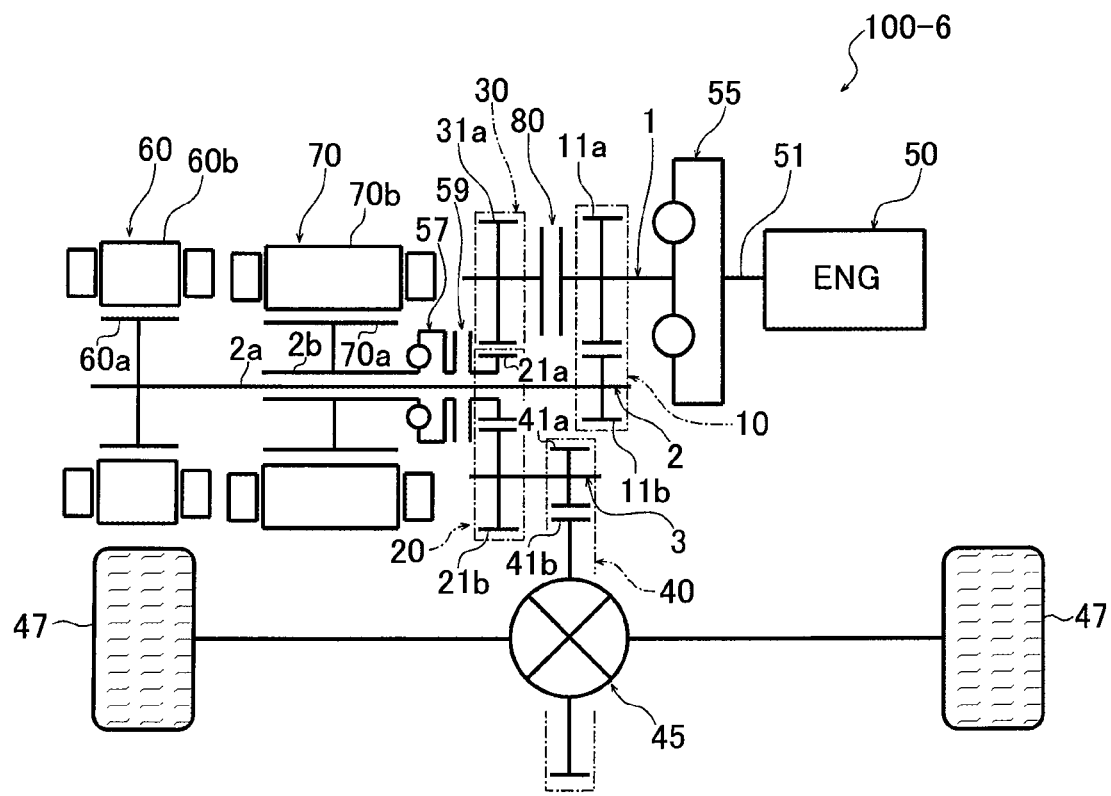
FIG. 10 is a skeleton diagram illustrating a schematic configuration of a driving device for hybrid vehicle in accordance with a sixth embodiment of the present invention.

Next, a sixth embodiment of the present invention will be described. FIG. 10 is a skeleton diagram showing a schematic configuration of a driving device for hybrid vehicle in accordance with a sixth embodiment of the present invention. In the driving device for hybrid vehicle 100-6 shown in the same figure, compared to the driving device for hybrid vehicle 100-4 of the fourth embodiment, the second flywheel damper (or the second torque fluctuation absorbing mechanism) 56 and the torque limiter (or the torque limiter mechanism) 58 that are provided between the generator motor 60 on the inner circumferential shaft 2a and the input gear 11b of the gear train for generator drive 10 is omitted. Rest of the configuration is the same as the driving device 100-4 of the fourth embodiment.

Seventh Embodiment

Figure 11:
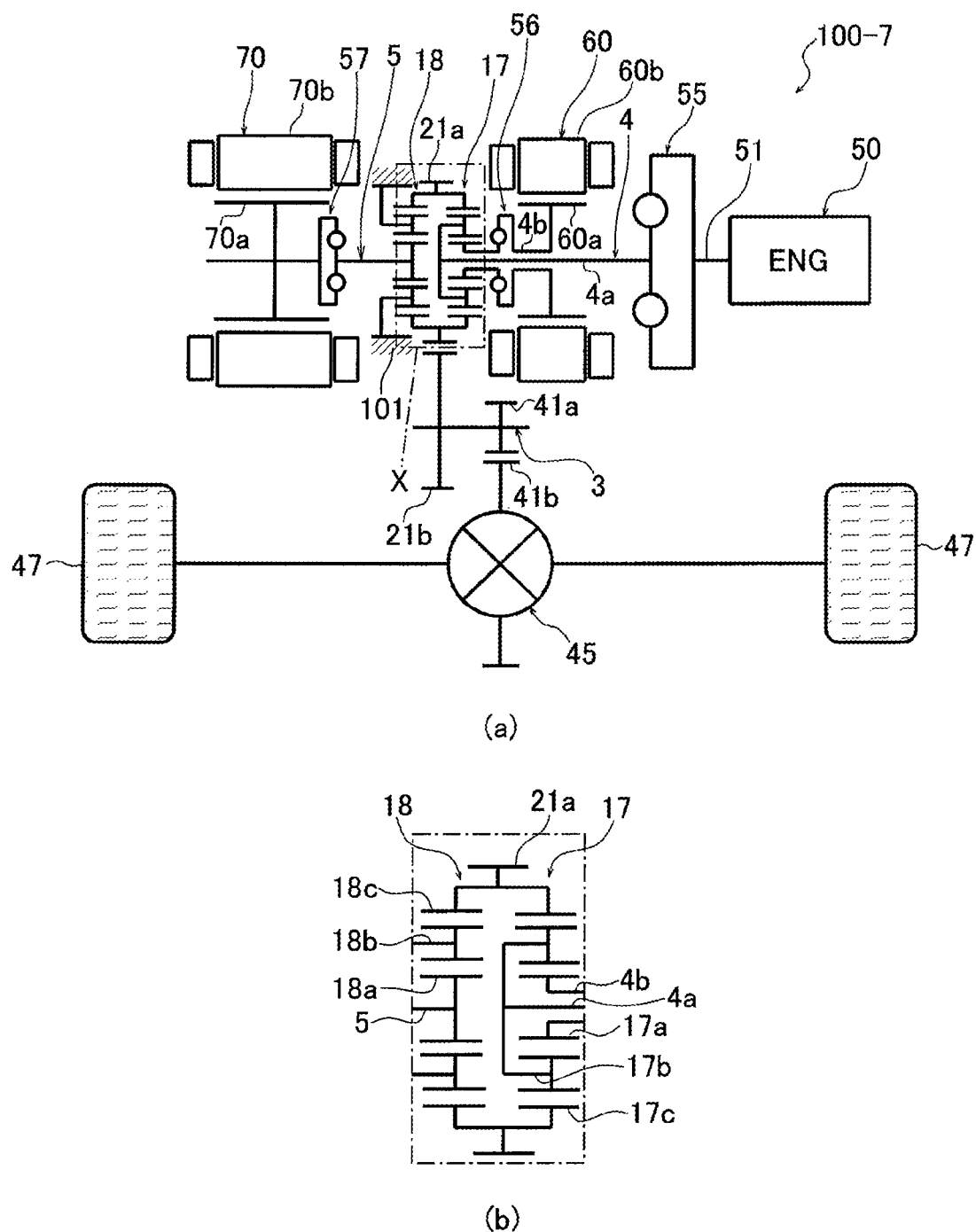
FIG. 11 is a skeleton diagram illustrating a schematic configuration of a driving device for hybrid vehicle in accordance with a seventh embodiment of the present invention.

Next, a seventh embodiment of the present invention will be described. FIG. 11(*a*) is a skeleton diagram showing a schematic configuration of a driving device for hybrid vehicle in accordance with the seventh embodiment of the present invention, and FIG. 11(*b*) is a partially enlarged view showing X part of FIG. 11(*a*). The driving device for hybrid vehicle 100-7 shown in the same figure is configured to comprise the engine 50, the generator motor (or the first motor) 60 that primarily functions as a generator, and the traction motor (or the second motor) 70 that primarily functions as an electric motor.

Also, it comprises a power distribution mechanism 17 and a speed change mechanism 18 as mechanisms for appropriate distribution and transmission of driving force among the engine 50, the generator motor 60, the traction motor 70 and the drive wheels 47.

Both the power distribution mechanism 17 and the speed change mechanism 18 are single pinion type planetary gear mechanisms. The power distribution mechanism 17 comprises a carrier 17b fixed on an inner circumferential shaft 4a of the rotating shaft 4, a sun gear 17a fixed on an outer circumferential shaft 4b of the rotating shaft 4, and a ring gear 17c connected to the traction motor 70 intervened by the speed change mechanism 18. Driving force from the crankshaft 51 of the engine 50 is input to the inner circumferential shaft 4a of the rotating shaft 4 via the first flywheel damper 55.

Also, driving force from the generator motor 60 is input to the outer circumferential shaft 4b of the rotating shaft 4 via the second flywheel damper 56. On the other hand, the speed change mechanism 18 comprises a carrier 18b fixed on a case 101 of the driving device 100-7, a sun gear 18a connected to the rotating shaft 5, and a ring gear 18c connected to the generator motor 60 intervened by the power distribution mechanism 17. Driving force from the traction motor 70 is input to the rotating shaft 5 via the third flywheel damper 57.

Also, in the driving device 100-7 of the present embodiment, vehicle running (EV running) by driving force of the generator motor 60 or the traction motor 70 is enabled by causing either of the generator motor 60 or the traction motor 70 to function as an electric motor when the engine 50 is in stopped state. In other words, when the generator motor 60 functions as an electric motor with the engine 50 stopped, driving force of the generator motor 60 is transmitted from the sun gear 17a of the power distribution mechanism 17 to the ring gear 17c. At this time, rotation of the carrier 17b that is connected to the crankshaft 51 of the engine 50 is 0. Therefore, the ring gear 17c of the power distribution mechanism 17 and the ring gear 18c of the speed change mechanism 18 rotate identically, and the rotor 70a of the traction motor 70 connected to the sun gear 18a of the speed change mechanism 18 rotates. Thus, the traction motor 70 is in power generation state, or the rotor 70a is in free-run state (or idling state). On the other hand, when the traction motor 70 functions as an electric motor, driving force of the traction motor 70 is transmitted from the sun gear 18a of the speed change mechanism 18 to the ring gear 18c. At that time, the rotor 60a of the generator motor 60 that is connected to the sun gear 17a of the power distribution mechanism 17 rotates. Thus, the generator motor 60 is in power generation state, or the rotor 60a is in free-run state (or idling state).

Also, in the driving device 100-7 of the present embodiment, a vehicle can be run only with driving force of the engine 50 or with both driving force of the engine 50 and driving force of either of the generator motor 60 or the traction motor 70, by causing the generator motor 60 and the traction motor 70 to appropriately function as an electric motor or a generator during operating the engine 50.

As a specific example of this case, when the generator motor 60 functions as a generator during operating the engine 50, driving force of the engine 50 input to the carrier 17b of the power distribution mechanism 17 is distributed to the sun gear 17a and the ring gear 17c according to gear ratios thereof, and the generator motor 60 generates power by driving force distributed to the sun gear 17a. Further, electric power generated by the generator motor 60 is either supplied to the traction motor 70 to be converted into driving force or accumulated in an accumulator battery. Moreover, in this case, driving force transmitted to the drive wheels (or a foot shaft) 47 of vehicle is driving force that is a sum of driving force of the traction motor 70 and driving force that is distributed from the engine 50 to the ring gear 17c of the power distribution mechanism 17.

Further, when the generator motor 60 functions as an electric motor, a sum of driving force of the engine 50 that is input to the carrier 17b of the power distribution mechanism 17 and driving force of the generator motor 60 that is input to the ring gear 17c is output to the ring gear 17c. Also in this case, the ring gear 17c of the power distribution mechanism 17 and the ring gear 18c of the speed change mechanism 18 rotate identically. In the traction motor 70 connected to the sun gear 18a of the speed change mechanism 18, power is generated by driving force of the engine 50 according to required quantity. Moreover, in this case, driving force transmitted to the drive wheels (or the foot shaft) 47 of vehicle is a driving force derived by subtracting power generating capacity of the traction motor 70 (or driving force required for power generation) from a sum of driving force of the generator motor 60 and driving force of the engine 50. Further, this driving mode is used when lowering a engine operating point for improving fuel efficiency mainly at a time of high-speed cruising travel.

Also, as a mechanism for absorbing fluctuations in torque transmitted to the driving force transmission path that will be described later, the driving device for hybrid vehicle 100-7 of the present embodiment comprises the first flywheel damper (or the first torque fluctuation absorbing mechanism) 55 provided between the crankshaft 51 of the engine 50 and the inner circumferential shaft 4a of the rotating shaft 4, the second flywheel damper (or the second torque fluctuation absorbing mechanism) 56 provided between the generator motor 60 on the outer circumferential shaft 4b and the power distribution mechanism 17, and the third flywheel damper (or the third torque fluctuation absorbing mechanism) 57 provided between the traction motor 70 on the rotating shaft 5 and the speed change mechanism 18.

Also, driving device 100-7 for hybrid vehicle of the present embodiment has the first driving force transmission path for transmitting driving force of the engine 50 to the drive wheels 47, 47, the second driving force transmission path for transmitting driving force between the generator motor 60 and the engine 50, and the third driving force transmission path for transmitting driving force of the traction motor 70 to the drive wheels 47, 47.

In the first driving force transmission path, driving force is transmitted in a path of the engine 50→the crankshaft 51→the first flywheel damper 55→the inner circumferential shaft 4a→the power distribution mechanism 17 and the speed change mechanism 18→the output gear 21a and the input gear 21b→the idler shaft 3→the final gear train 40→the differential mechanism 45→the drive wheels 47, 47. In the second driving force transmission path, driving force is transmitted in a path of the generator motor 60→the outer circumferential shaft 4b→the second flywheel damper 56→the power distribution mechanism 17→the inner circumferential shaft 4a→the first flywheel damper 55→the crankshaft 51→the engine 50, or in a path with reverse direction. In the third driving force transmission path, driving force is transmitted in a path of the traction motor 70→the third flywheel damper 57→the power distribution mechanism 17 and the speed change mechanism 18→the output gear 21a and the input gear 21b→the idler shaft 3→the final gear train 40→the differential mechanism 45→the drive wheels 47, 47.

In the driving device for hybrid vehicle 100-7 of the present embodiment, the first flywheel damper 55 installed between the crankshaft 51 of the engine 50 and the inner circumferential shaft 4a is a mechanism that is capable of absorbing torque fluctuations in the first driving force transmission path; the second flywheel damper 56 installed between the generator motor 60 on the outer circumferential shaft 4b and the power distribution mechanism 17 is a mechanism that is capable of absorbing torque fluctuations in the second driving force transmission path; and the third flywheel damper 57 installed between the traction motor 70 on the rotating shaft 5 and the speed change mechanism 18 is a mechanism that is capable of absorbing torque fluctuations in the third driving force transmission path.

In this manner, the driving device for hybrid vehicle 100-7 of the present embodiment also comprises the second flywheel damper (or the second torque fluctuation absorbing mechanism) 56 that can absorb torque fluctuations in the second driving force transmission path T2 that transmits driving force between the generator motor 60 and the engine 50, in addition to the first flywheel damper (or the first torque fluctuation absorbing mechanism) 55 capable of absorbing torque fluctuations in the first driving force transmission path T1 that transmits driving force of the engine 50 to the drive wheels 47; wherein when transmitting driving force of the generator motor 60 to the engine 50 in the second driving force transmission path T2 at a time of starting the engine 50, the driving force is configured to be transmitted via both the first flywheel damper 55 and the second flywheel damper 56, and when transmitting driving force of the engine 50 to the drive wheels 47 in the first driving force transmission path T1 at a time of vehicle running, the driving force is transmitted via the first flywheel damper 55.

In this manner, since occurrence of resonance in the second driving force transmission path T2 when starting the engine 50 with the generator motor 60 can be avoided by providing the second flywheel damper 56 in addition to the first flywheel damper 55, vehicle body vibrations caused by the resonance can be prevented. This enables to effectively reduce vehicle body vibrations and noise at a time of starting the engine 50.

Further, according to the driving device for hybrid vehicle 100-7, natural frequencies of the driving force transmission paths can be set respectively in the flywheel dampers 55-57 by installing the flywheel dampers 55-57 respectively in the driving force transmission paths. This enables easy set-up of characteristics of the flywheel dampers 55-57 suitable to each driving mode where driving force is transmitted by each of the driving force transmission paths T1-T3. Thus, since transient resonance phenomenon in each driving mode where driving force is transmitted to each driving force transmission path T1-T3 can be avoided, vehicle body vibrations caused by resonance can be prevented or effectively reduced.

In addition, the driving device for hybrid vehicle 100-7 of the present embodiment has a structure that the gear train connecting between the drive wheels (or a foot shaft) 47 and each of the traction motor 70, the generator motor 60 and the engine 50 is always meshed. Therefore, only with the first flywheel damper 55 installed in the output shaft 51 of the engine 50, resonance may occur in each driving force transmission path due to a torque input from the drive wheels 47 side. In this regard, in the driving device 100-7 of the present embodiment, since the flywheel dampers 55-57 are installed respectively in the driving force transmission paths, occurrence of resonance due to such torque input from the drive wheels 47 side can be effectively prevented.

The present embodiment shows a case that the second flywheel damper 56 is installed on the second driving force transmission path and the third flywheel damper 57 is installed on the third driving force transmission path. In addition, changes similar to the driving devices 100-2 to 100-6 of the second to sixth embodiments corresponding to the driving device 100 of the first embodiment can be made, an illustration of which is omitted in the figure. In other words, in the driving device for hybrid vehicle 100-7 of the present embodiment, either one of the second flywheel damper 56 or the third flywheel damper 57 can be omitted, and a torque limiter installed in series with at least either one of the second flywheel damper 56 and third flywheel damper 57 can be provided.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof. For example, the driving device for hybrid vehicle 100 of the above-described embodiment shows a case that both the output gear 31a of the engine driving force transmitting gear train 30 and the output gear 21a of the motor driving force transmitting gear train 20 are configured to mesh with the input gear 21b on the idler shaft 3 to share the input gear 21b on the idler shaft 3. In addition to this case, an embodiment of a driving device for vehicle in accordance with the present invention can also be configured to provide an input gear of the engine driving force transmitting gear train and an input gear of the motor driving force transmitting gear train separately on the idler shaft, an illustration of which is omitted in the figure. In that case, the engine driving force transmitting gear train and the motor driving force transmitting gear train are to be arranged in side-by-side alignment in an axial direction.

The invention claimed is:

1. A driving device for a hybrid vehicle having an engine and a motor comprising:
   a first driving force transmission path that transmits driving force of the engine to drive wheels of the vehicle:
   a second driving force transmission path that transmits driving force between the motor and the engine;
   a first torque fluctuation absorbing mechanism that can absorb torque fluctuations on the first driving force transmission path; and
   a second torque fluctuation absorbing mechanism that can absorb torque fluctuations on the second driving force transmission path,
   wherein driving force of the motor is transmitted via both the first torque fluctuation absorbing mechanism and the second torque fluctuation absorbing mechanism when transmitting the driving force of the motor to the engine in the second driving force transmission path at a time of starting the engine,
   wherein the driving force of the engine is transmitted via the first torque fluctuation absorbing mechanism, out of the first torque fluctuation absorbing mechanism and the second torque fluctuation absorbing mechanism, when transmitting the driving force of the engine to the drive wheels in the first driving force transmission path while the vehicle is running, and
   wherein the motor is the first motor that can generate power by driving force of the engine, the driving device further comprising:
   a second motor that can supply driving force to the drive wheels and a third driving force transmission path that transmits driving force of the second motor to the drive wheels; and a third torque fluctuation absorbing mechanism that can absorb torque fluctuations on the third driving force transmission path, wherein the driving force of the second motor is transmitted via the third torque fluctuation absorbing mechanism, out of the first to third torque fluctuation absorbing mechanisms, when transmitting the driving force of the second motor to the drive wheels in the third driving force transmission path while the vehicle is running.

2. A driving device for a hybrid vehicle as claimed in claim 1, wherein a speed reduction mechanism part for decelerating rotation of the motor and transmitting to the engine side is provided in the second driving force transmission path, and wherein the second torque fluctuation absorbing mechanism is arranged between the motor and the speed reduction mechanism part on the second driving force transmission path.

3. A driving device for a hybrid vehicle as claimed in claim 1, wherein at least either one of a torque limiter mechanism that is installed in series with the second torque fluctuation absorbing mechanism on the second driving force transmission path so as to block a torque equal to or greater than a predetermined value transmitted via the second driving force transmission path or another torque limiter mechanism that is installed in series with the third torque fluctuation absorbing mechanism on the third driving force transmission path so as to block a torque equal to or greater than a predetermined value transmitted via the third driving force transmission path is provided.

4. A driving device for a hybrid vehicle as claimed in claim 1, wherein at least either one of the second torque fluctuation absorbing mechanism or the third torque fluctuation absorbing mechanism is arranged on an inner diameter side of a rotor fixed to a rotating shaft, the rotor of either the first motor or the second motor.

5. A driving device for a hybrid vehicle as claimed in claim 1, wherein a speed reduction mechanism part for decelerating rotation of the motor and transmitting to the engine side is provided in the second driving force transmission path, and wherein the second torque fluctuation absorbing mechanism is arranged between the motor and the speed reduction mechanism part on the second driving force transmission path.

6. A driving device for a hybrid vehicle that has an engine, a first motor that can generate power by driving force of the engine, and a second motor that can supply driving force to drive wheels of the vehicle, comprising:

a first driving force transmission path that transmits driving force of the engine to the drive wheels;
a second driving force transmission path that transmits driving force between the first motor and the engine;
a third driving force transmission path that transmits driving force of the second motor to the drive wheels;

a first torque fluctuation absorbing mechanism that can absorb torque fluctuations on the first driving force transmission path;
a second torque fluctuation absorbing mechanism that can absorb torque fluctuations on the second driving force transmission path; and
a third torque fluctuation absorbing mechanism that can absorb torque fluctuations in the third driving force transmission path, wherein when transmitting driving force of the first motor to the engine in the second driving force transmission path at a time of starting the engine, the driving force of the first motor is transmitted via the first torque fluctuation absorbing mechanism and the second torque fluctuation absorbing mechanism, out of the first to third torque fluctuation absorbing mechanisms, wherein when transmitting driving force of the engine to the drive wheels in the first driving force transmission path while the vehicle is running, the driving force of the engine is transmitted via the first torque fluctuation absorbing mechanism, out of the first to third torque fluctuation absorbing mechanisms, and wherein when transmitting driving force of the second motor to the drive wheels in the third driving force transmission path while the vehicle is running, the driving force of the second motor is transmitted via the third torque fluctuation absorbing mechanism, out of the first to third torque fluctuation absorbing mechanisms.

7. A driving device for a hybrid vehicle as claimed in claim 6, wherein a speed reduction mechanism part for decelerating rotation of the motor and transmitting to the engine side is provided in the second driving force transmission path, and wherein the second torque fluctuation absorbing mechanism is arranged between the motor and the speed reduction mechanism part on the second driving force transmission path.

8. A driving device for a hybrid vehicle as claimed in claim 6, wherein at least either one of a torque limiter mechanism that is installed in series with the second torque fluctuation absorbing mechanism on the second driving force transmission path so as to block a torque equal to or greater than a predetermined value transmitted via the second driving force transmission path or another torque limiter mechanism that is installed in series with the third torque fluctuation absorbing mechanism on the third driving force transmission path so as to block a torque equal to or greater than a predetermined value transmitted via the third driving force transmission path is provided.

9. A driving device for a hybrid vehicle as claimed in claim 6, wherein at least either one of the second torque fluctuation absorbing mechanism or the third torque fluctuation absorbing mechanism is arranged on an inner diameter side of a rotor fixed to a rotating shaft, the rotor of either the first motor or the second motor.

* * * * *